United States Patent [19]
Xu

[11] Patent Number: 5,995,958
[45] Date of Patent: Nov. 30, 1999

[54] SYSTEM AND METHOD FOR STORING AND MANAGING FUNCTIONS

[76] Inventor: Kevin Houzhi Xu, 34 Willow Dr., Apt. 2B, Ocean, N.J. 07712

[21] Appl. No.: 08/925,847

[22] Filed: Sep. 8, 1997

Related U.S. Application Data

[60] Provisional application No. 60/039,841, Mar. 4, 1997.

[51] Int. Cl.$^6$ ........................................................ G06F 9/00
[52] U.S. Cl. ...................................................... 707/3; 707/4
[58] Field of Search ........................................ 707/1–205

[56] References Cited

U.S. PATENT DOCUMENTS

| | | | |
|---|---|---|---|
| 4,558,413 | 12/1985 | Schmidt et al. | 364/973 |
| 5,434,972 | 7/1995 | Hamlin | 395/200.68 |
| 5,871,537 | 7/1998 | Ramaswami et al. | 370/254 |

*Primary Examiner*—Thomas G. Black
*Assistant Examiner*—John G. Mills, III
*Attorney, Agent, or Firm*—Gerald J. Smit

[57] ABSTRACT

A computer system and method for storing and managing a database that has lambda-definable functions as its foundation. The database is a collection of nodes that are connected by a set of links, and further it is a directed acyclic graph constructed from the nodes and the links. There are two types of links. By ignoring one type of the links, the database can be viewed as a set of trees; and by ignoring another type of the links, the database can be viewed as another set of trees. The directed acyclic graph and the two sets of trees illustrate the dependent relationships among the data and provide means in manipulating the database. A node has a name for the purpose of identification; and a value that carries an unit of meanings of the database application. The value of a node is selected from a regular data type, user-defined data type, and lambda-definable functions. Managing lambda-definable functions allows a database to support infinite data with finite storage. It is proved that a database is an enumeration of the properties of a lambda-definable function; and a lambda-definable function is the abstraction of a database. This gives a database management system the full computing capability that a computer has. Thus a database application doesn't need application-dependent software development in host programming languages except for high-level functional specifications, which reduces the development cost of the database application, and improves the reliability and performance of the database application.

4 Claims, 7 Drawing Sheets

Fig. 6

SSD ≡ λx:{resident | in U.S.A.}. x  ~160 resident = x:RDN ≡ λx:{birthdate, ssn}.x  ~161 birthdate = Birth ≡ x:D  ~162 ssn = SSN ≡ x:N  ~163 university = x:RDN ≡ λx:{admin} ∪ {dept | in the university}.x  ~164 admin = Admin ≡ λx:{student | student ⊒d [[SSD] resident]}. x  ~165 student = x:RDN ≡ λx:{enrolldate, major, regno}. x))  ~166 enrolldate = Enroll ≡ x:D  ~167 major = Major ≡ x:S  ~168 regno = Reg# ≡ x:N  ~169 dept = x:S ≡ λx:{class | in the dept}. x  ~170   171 class=x:RDN ≡ λx:{student | student ⊒d [[[university] admin] student]}.x student = x:RDN ≡ λx:{grade}. x  ~172 grade=Grade ≡ x:C  ~173 assembly = x:RDN ≡ λx:{unit | in the assembly}. x  ~201 unit = x:RDN ≡ λx:({assembly} ∨ {part}).x  ~202 part = x:RDN ≡ λx. ... .x  ~203

SYSTEM AND METHOD FOR STORING AND MANAGING FUNCTIONS

This application claims benefit of U.S. Provisional Application 60/039,841, filed on Mar. 4, 1997.

BACKGROUND OF THE INVENTION

1. Field of the invention

This invention is related to database management systems, computer systems, and computing application systems in which lambda-definable (effectively computable) functions including discrete data are stored and managed. These systems are used to manage various informations in businesses, in scientific researches, in computer systems, and in human livings.

2. Description of the prior art

A traditional database is a collection of related discrete data. It is physically supported by a software called a database management system (DBMS), and physical storages that permanently store the data. The DBMS provides an interface between the data and the rest of the world (users). It shows to users how the stored data is related or organized, and then allows users to insert new data into the database, to update, delete and retrieve data in the database.

The way of showing the discrete data to users is dominated by the DBMS, and are the key criterion to evaluate the quality of the database, or specifically the quality of the DBMS. A hierarchical DBMS exhibits stored data in a hierarchical fashion in the sense that the stored data is organized in a hierarchical structure. A network DBMSs exhibits stored data in a network fashion in the sense that the stored data is organized in a network structure. A relational DBMS exhibits stored data in a set of tables. And a object-oriented DBMS exhibits stored data in the way similar to a network DBMSs, but with additional concepts such as object super/sub classes and inheritances.

Hierarchical and network DBMSs are no longer popular due to their limitations in database applications and due to other reasons. Relational database management systems are the most popular and effective in the modern industry. Although relational DBMSs have many disadvantages in database applications, there hasn't had other DBMSs that could take over the leading position of relational DBMSs. Object-oriented database managements systems were introduced under criticisms against relational database management systems. However, they don't provide significant improvement enough in taking over the leading position.

The way of showing the discrete data in a database immediately affects the cost of the development and the maintenance of a database application that uses the DBMS. FIG. 1 illustrates a typical system architecture of a database application. Through analyzing each component of the database application, the disadvantages of the traditional DBMSs are itemized later.

In FIG. 1, Database Application 20 is a typical database application system in which Relational Database 24 is the core of Database Application 20. Relational Database 24 physically comprises Relational DBMS 25 and storages 26 and 27, and it logically shows to users that the stored data 27 is organized in n-ary relations (tables). Therefore Relational Database 24 actually is viewed as an accessible relational database with the support of its physical components. Stored Data 27 is the physical storage that keeps the database 24 permanently alive; and Data Schema 26 is a piece of storage permanently storing the application-dependent data schema that defines partial rules of the database 24. In Relational DBMS 25, there are two functional modules—Relational Constraints 28a and Query Interpreter 29a. Relational Constraints 28a is the software that provides the interface for users to change the data schema 26 and the stored data 27. It guarantees that data accesses from users remain the integrity of the database 24 in the sense that each change to the database 24 obeys the rules specified in the Data Schema 26 and the rules of the regular relational databases. Another functional module in Relational DBMS 25 is Query Interpreter 29a that accepts queries in SQL, translates them into file-access statements and returns the answers. Relational Database 24 is accessed through message channel 33 and 34. Although SQL should be more accurately refer to a query language that interfaces with Query Interpreter 29a, SQL here (and in industry also) refers to the overall language that includes a Database Definition Language (DDL) through the message channel 34 and a Data Manipulating Language (DML) through the message channel 33 that further includes the query language. The data schema 26 is entered through the message channel 34 by systems administrators. Stored Data 27 is accessed through the message channel 33.

User Interface 21 is the software supporting a display in text, in tabular form, or in graph through which users interact with Relational Database 24. Procedure Calls 30 is a set of procedure calls that represent the functional specifications of data access requests. With the traditional database 24, Database Application 20 normally requires more components. Application Software 23 is the software developed specifically for the database application 20, and it is the implementations of the specifications in Procedure Calls 30. It translates a procedure call into a sequence of operations in Relational DBMS 25. Application Software 23 functionally comprises the module of Application Constraints 28b, and the module of Application Query Interpreter 29b. Application Constraints 28b enforces additional rules in changing the state of Relational Database 24, which is a make-up of both Relational Constraints 28a and Data Schema 26. Application Query Interpreter 29b implements the query specifications from procedure calls 30 that accomplishes the implications of the query specifications to Relational Database 24. Data Interpreter 22 is a software for the data communication of the database application 20 with the rest of world. It translates data from a language to another. Message channels 32 and 35 are in a language convenient to the database application, and defined by the database application. Channel 31 is a language commonly used by industry for data communication.

The disadvantages of the traditional database management system 24 are summarized in the following:

1. Low computing automation. For a typical data application 20 which uses a relational DBMS 25, the application-dependent software, Application Software 23 above Relational DBMS 25, is needed to satisfy high-level specification from User Interface 21. The necessity of the application-dependent software 23 stems from the following two circumstances. For more detailed theoretical discussion about data models and database queries, see "Foundations of Databases", S. Abiteboul, R. Hull, V. Vianu, Addison-Wesley Publishing Company, 1995:

A) To create, delete, or modify a data instance that has dependent relationship with other data, users want to specify the operation at high level in the sense that multiple operations in Relational DBMS 25 are triggered by the high-level specification implied in a procedure call. For instance, if the database application 20 is a CAD related database application, users only specifies through User Interface 21 that a car is to be created that triggers a procedure call in the module 30. Then the creation of the car implies the creation of thousands of parts inside the car in the database 24. If Database Application 20 is for a school administration, users through User Interface 21 only specifies that a student quits from the school that triggers a procedure call in the module 30. Then the student's quitting implies the removal of all the records related to the student from Database 24, such as the name in the registration office; the student's study records in several classes; and the name in a sports club.

Relational DBMS 25 is not able directly to interface with User Interface 21 (either through a set of procedure calls in the module 30, or any other high-level specifications). The reason is that tabular structures (relations) used by the database 24 are too simple to manage complex objects (data); or equivalently, the reason is that SQL is not able to support the high-level specifications that users need. Therefore, Database Application 20 needs Application Constraints module 28b constructed from host programming languages that further controls data accesses to Relational Database 24. Application Constraints 28b is a makeup of both Relational Constraints 28a and Data Schema 26.

B. To support queries from users, the Application Query Interpreter 29b in Application Software 23 is also required. First of all, Database Application 20 usually avoid using join or union operations in SQL. The reason is that the join or union operations are very expensive in terms of performance (measurement of computing time). Therefore, user-guided data searching embedded in Application Query Interpreter 29b is provided to replace the join and union operations. Secondly, SQL is not able to express queries involving least fixpoints (similar to "While" statement in a host programming language) that are common in a typical database application. Although a theoretical query language Datalog supports least fixpoint queries, it is too expensive to be used in practice. Thirdly, the sets as the responses to queries in SQL or Datalog miss certain application information that User Interface 21 needs. For example in FIG. 9, no matter how the directed graph is managed by a relational database, SQL or Datalog is not able to return <A, B, C, D> in the sequence as the answer of the query "print a sequence of nodes that form a directed path from A to D". Thus, a host programming language must be used to support queries beyond the capability of SQL. Application Query Interpreter 29b is a make-up of SQL Interpreter 29a.

Because Application Software 23 needs to be constructed per Database Application 20, the degree of computing automation is low. It is well-known that developing Application Software 23 is the most expensive effort in the development life cycle of Database Application 20.

2. Expense of developing Data Interpreter 22. To communicate with other computer systems, Database Application 20 needs additional module—Data Interpreter 22 developed in host programming languages. In a distributed computing environment, a common language is needed for sub-systems to talk to each other. A modern relational DBMS 25 normally supports a SQL-based language for data communication. However, the SQL-based languages are normally not accepted as efficient languages for data communication. There are many standards defined in data communication that use hierarchical-based structures for carrying data. However hierarchical-based structures are not effective in storing data in databases. This requires a language interpreter—Data Interpreter 22 between database application 20 and other systems. Since Data Interpreter 22 interacts with Application Software 23, Data Interpreter 22 is also application-dependent, and it is developed per database application.

3. Poor system reliability and performance of the database application. Developing Application Software 23 and Data Interpreter 22 not only significantly increases the cost of the development of Database Application 20, but it also degrades the system reliability and performance of the database application. It is obvious that Application Software 23 and Data Interpreter 22 developed in a short period of time normally provides less reliability than a general-purpose product such as Relational DBMS 25 does. Similarly, due to computing overhead involving in many layers without clean functional partitioning (from Stored Data 27 to User Interface 21), the overall performance of the database application 20 is degraded.

4. Disability of managing large volume of data. Due to the flat structures of Relational Database 24, relational DBMSs have unacceptable system performances once the size of the databases become large. For more detailed discussion, see "Future Trends in Database Systems" by M. Stonebraker and L. Rowe, IEEE transactions of Knowledge and Data Engineering, Vol. 1., No. 1, March, 1989, pp 33–44.

5. Disability of integrating with other computer application systems. Different common languages are used for different database applications. As a result, different distributed database applications cannot talk to each other. Further, database applications that normally store and maintain discrete data cannot talk to other computing systems that deal with mathematically expressible functions. For example, a database user through User Interface 21 is not able to submit queries like: what is the square of a integer?

6. Not easy to learn. Database Application 20 is physically supported by Relational DBMS 25 and Application Software 23 that don't provide clean functional partitioning in terms of system architecture. And further Database Application 20 is built with many different languages such as SQL, a host programming language, and a common communication language. These make Database Application 20 difficult to be understood and to be developed.

SUMMARY OF THE INVENTION

This invention utilizes lambda calculus as the foundation of DBMSs. Recall that relational DBMSs are constructed with the foundation of relational theory. With relational theory, users are not able to specify certain operations that have complex implications, and system developers have to use host programming languages to construct application-dependent software (Application Software 23) so that users' high-level specifications (Procedure Calls 30) can be accomplished. Lambda calculus, however, is a theory that defines the upper-bound of the computing capability of a computer. Like Turing machines—the foundation of imperative host programming languages, lambda calculus enable users to specify any function under the class of lambda-definable (or effective computable) functions. Database applications, obviously, are the subset of lambda-definable functions. Thus, DBMSs of this invention shall be able to take any specification from users with lambda calculus as the foundation.

More specifically, a DBMS of this invention considers a database application as a lambda-definable function. The corresponding database is an enumeration of the properties of the function. Further more, the DBMS takes a functional programming language as its language that has the foundation of lambda calculus. This language is used for data schema definitions, data accesses, and data communications. The syntax of this language is not important but the contents of the language in this description. Thus in this description, different syntaxes are used exchangeablly for illustrations. They can be in pure lambda calculus, typed lambda calculus, functional languages, or even English. For more discussion about lambda calculus and functional programmings, see "Conception, Evolution, and Application of Functional Programming Languages" by P. Hudak, ACM Computing Survey, Vol. 21, No. 3, September 1989.

FIG. 2 illustrates the system architecture of a database application by using LDF (Lambda-Definable Functional) DBMS 45 of this invention. There are only three components in Database Application 40: LDF Database 44; Functional Specifications 50; and User Interface 41. The module 44 illustrates the physical components supporting a LDF database. It is named as "LDF Database" because it is a database (system) from users' view point. In this description, the term "LDF Database" is usually used to refer to the database itself such as the module 44a in FIG. 3; 44b in FIG. 5; 44c in FIG. 8 and 44d in FIG. 10. LDF DBMS 45 that supports LDF Database 44 is the software that interfaces with systems administrators through message channel 54; with User Interface 41 through message channel 53; and with other systems through message channel 51. More specifically, LDF DBMS 45 comprises the functional module LDF Constraints 48 that enable users to specify any constraints applied to the database application 40; and LDF Query Interpreter 49 that enable users to specify any query against the stored data. The systems administrators define Data Schema 46 that is equivalent to a lambda-definable function which captures all information and constraints required by the database application 40. Other systems are able to manipulate Database 40 through message channel 51. Message channel 51, 53, 54 are in a common functional programming language.

Functional Specifications 50 is a set of high-level specifications in a functional programming language and/or a set of procedure calls. Normally, a data access request is expressed in a specification in the functional programming language. However, if the specification of the data access request is too long in terms of size to be passed through the message channel 53 with a limited throughput, a procedure call (a procedure name plus its parameters) can be placed in Functional Specifications 50. And the body of the corresponding specification is stored in Stored Data 47 as application data. When the procedure call in Functional Specification 50 is triggered by User Interface 41, the stored body of the corresponding specification in Stored Data 47 will be executed eventually.

The advantages of the DBMS of this invention are itemized below by using FIG. 2 as the example:

1. High computing automation. As mentioned above, systems administrators are able to define all constraints of the database application 40 through channel 54; LDF DBMS 45 is able to take "complex data" from User Interface 41, and to store it in Stored Data 47; the common language with lambda calculus is used for all the message channels 51, 53 and 54, and the only application-dependent software is Functional Specifications 50. This indicates that the automation degree of developing database application is increased significantly.
2. No data translation is needed. Since a functional language is for data communication with the rest of th world, the application-dependent software for data translation is not needed.
3. High system reliability and performance. The entire Database Application 40 only consists of LDF DBMS 45, Functional Specifications 50, and User Interface 41. DBMS 45 is a general-purpose product from other vendors with high reliability. Functional Specification 50 is the only application-dependent software in a high-level language. Therefore, the system reliability is significantly improved. And the system performance also is improved because computing overhead is not existed any more due to clean functional partitioning in Database Application 40. Although it is known that a general functional programming language implies low system performance, the functional programming language used in message channels 51, 53, and 54 is supported by a set of built-in procedures that stem from the special structure of the database in LDF Database 44. The set of built-in procedures are efficient in accessing LDF Database 44, and support most of queries from users. Further more, the special structure of the database in LDF Database 44 will also significantly benefit the overall system performance of the functional programming language for data accesses. For more information, see the section "Detailed Description".
4. Ability to store large volume of data. Due to the special structure of the database in LDF Database 44, the Stored Data 47 can be stored in hierarchical structures. That makes data distribution easier.
5. Ability of integrating with other systems. Because a functional programming language in message channel 51 is used for data communication, it can be accepted as the common language for data communication that is able to specify any functions under the class of effectively computable functions. With the functional programming language as the common language, Database Application 40 can communicate with other systems without the need of data translation. An analog of a distributed database system is a distributed file system in which each subsystem can be easily "plugged" into the distributed file system without any additional software development.
6. Easy to learn. A participant of a database application development has less things to learn: applications, and the database technologies of LDF DBMSs.

In addition, A LDF database can logically support infinite data by using finite data storage because it is able to store a function under the class of effectively computable functions. It further can be used to store and manage all kinds of informations that a traditional DBMS can not manage, for example operating systems, file systems, graphical interfaces (for User Interface 41), and user-defined functions in Functional Specifications 50.

BRIEF DESCRIPTION OF THE DRAWINGS

In the drawings, closely related components have the same number but different alphabetic suffixes.

FIG. 6 shows the data schema of the database in FIG. 5 which is expressed in a functional programming language, and defines the super set of data instances that can appear in a database.

DETAILED DESCRIPTION

The Structure of the Invention

A preferred embodiment of this invention is LDF Database Management System 45 that keeps LDF Database 44 permanently alive and interfaces in a functional programming language with systems administrators through channel 54; User Interface 41 through channel 53; and the rest of world through channel 51 in Database Application 40 in FIG. 2.

Figure 3:
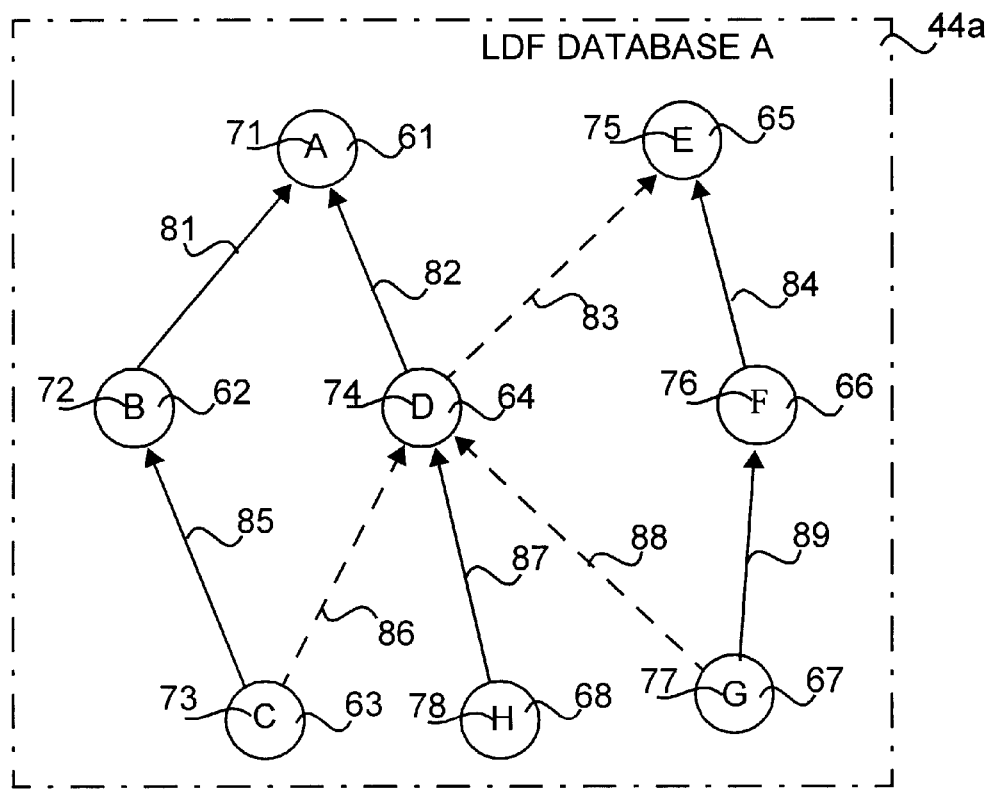
FIG. 3 shows the data organization of a typical database of this invention, which is a collection of zero or more nodes and zero or more links with two types, further is a directed acyclic graph, and a set of trees by ignoring any one type of links.

LDF Database 44a in FIG. 3 illustrates the data components aspect of the LDF Database 44 (as an example). LDF Database 44a consists of non-negative number of nodes represented by circles 61–68. A node is a unit of data in LDF Database 44a that is not dividable. The nodes are connected by directed links 81–89. LDF Database 44a follows certain rules to remain its integrity.

1. Directed links

A directed link is a physical reference (such as a pointer) that connects two nodes together at its two ends as a preferred embodiment of the invention. Given a node at the tail of a link, the node at the head of the link can be located immediately through the link.

There are two types of links as a preferred embodiment of the invention. One type of the links are represented by solid links with arrows. They are links 81, 82, 84, 85, 87, and 89 in FIG. 3. The node at the head of a link is called the solid head with respect to the link, and the node at the tail is called solid tail. For example, given link 81, A 61 is the solid head, and B 62 is the solid tail. In the later section "Theory of the Invention", A 61 is called the rator of B 62; and B 62 is the application of A 61, and two binary relations are used to represent this relationship: A 61 $\sqsubseteq_r$ B 62; or B 62 $\sqsupseteq_r$ A 61. The two binary relations become important operators in the queries of this invention. In "An Introduction to Enterprise-Participant Data Model" by K. Xu and B. Bhargava, in Seventh International Workshop on Database and Expert Systems Applications, September, 1996, Zurich, Switzerland, page 410–417, A 61 is called the superior participant of B 62; and B 62 is a subordinate of A 61.

The other type of links are represented by dash lines with arrows. In FIG. 3. They are links 83, 86, and 88. The node at the head of a dash link is called the dash head with respect to the link, and the node at the tail is called the dash tail. For example, given link 83, E 65 is the dash head, and D 64 is the dash tail. In the later section "Theory of the Invention", E 65 is called the rand of D 64; and D 64 is the image of E 65, and two binary relations are used to represent this relationship: E 65 $\sqsubseteq_d$ D 64; or D 64 $\sqsupseteq_d$ E 65. The two binary relations become important operators in the queries of this invention. In "An Introduction to Enterprise-Participant Data Model" by K. Xu and B. Bhargava, in Seventh International Workshop on Database and Expert Systems Applications, September, 1996, Zurich, Switzerland, page 410–417, E 65 is called the parent participant of D 64; and D 64 is a child of E 65.

A node without solid links pointing away from them are called solid roots. In FIG. 3, A 61 and E 65 are solid roots. A 61 and E 65 are called application roots in the later section "Theory of the Invention". One node is called a solid ancestor of another if one can travel from the second node to the first along non-negative number of solid links in the direction that the arrows point to. For example in FIG. 3, A 61 is an solid ancestor of A 61 itself, of B 62, and of C 63. On the other hand, A 61, B 62, and C 63 are solid descents of A 61. In the later section "Theory of the Invention", solid ancestor and solid descent are called as recursive rator and recursive application respectively; and the symbols of the corresponding binary relation are $\sqsubseteq r$ and $\sqsupseteq r$ respectively.

A node without dash links pointing away from them are called dash roots. In FIG. 3, E 65 is a solid root. E 65 is called an image root in the later section "Theory of the Invention". One node is called a dash ancestor of another if one can travel from the second node to the first along non-negative number of dash links in the direction that the arrows point to. For example in FIG. 3, E 65 is an dash ancestor of E 65 itself, of D 64, and of C 63. On the other hand, E 65, D 64, and C 63 are dash descents of E 65. In the later section "Theory of the Invention", dash ancestor and dash descent are called as recursive rand and recursive image respectively; and the symbols of the corresponding binary relation are $\sqsubseteq d$ and $\sqsupseteq d$ respectively.

A node without coming solid links is called solid leaf. And a node without coming dash links is called dash leaf.

2. Nodes

Figure 4:
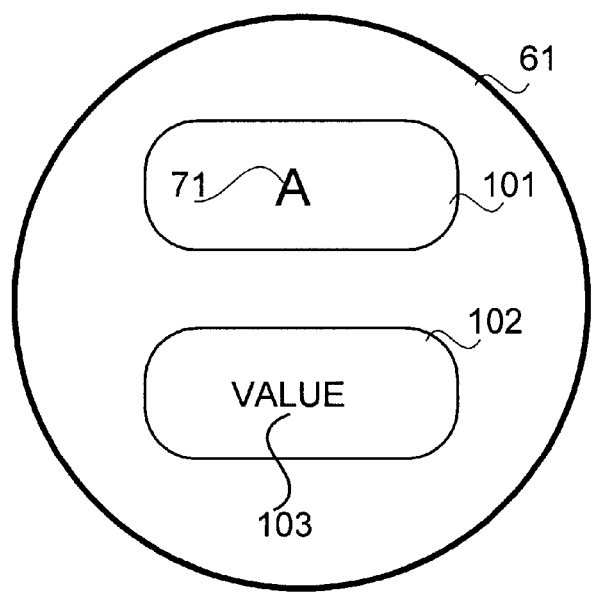
FIG. 4 shows that a node comprises only a name and a single value, and the value can be a function from the class of lambda-definable functions.

The term "node" is called "recursive application" in the later section "Theory of the Invention"; and "participant" in "An Introduction to Enterprise-Participant Data Model" by K. Xu and B. Bhargava, in Seventh International Workshop on Database and Expert Systems Applications, September, 1996, Zurich, Switzerland, page 410–417. FIG. 4 illustrates the components of node 61 as a preferred embodiment, and all of the nodes in FIG. 3 have the same internal structure of node 61. In node 61, there are two memory spaces 101 and 102 in which values can be recorded. A 71 inside the space 101 is the value of the space 101, and it is called the Related Distinguished Name (RDN) of the node 61. VALUE 103 is the value of the space 102, and it is called the value of the node 61.

As a preferred embodiment, a RDN is a sequence of one or more than one characters. In FIG. 3, the RDNs of nodes 61–78 are A 71, B 72, C 73, D 74, E 75, F 76, G 77, H 78. Other examples of RNDs are "ABC", "D123".

As a preferred embodiment, the value of a node can be one of the following:
1. A regular value with one of the data types supported by a programming language, for example, character, string, integer, floating point, and double-precision floating point. A node with a regular value normally is a solid leaf.

2. A user-defined value, for example, date, time, multimedia (video/audio) data, a file in a operating systems, and a program in software engineering. A node with a user-defined value shall be able to present the value in its nature form. For example, a node with its value of a sound shall have its facility such as computer program that drives to perform the sound. A node with user-defined value normally is a solid leaf.

3. An effective computable function, A node can have any effective computable function as its value. For example, a valid value is the function square: f(x)=sq x; another valid value is an identity function that represents a set: f(x)=x where x is from set {1, a, "string", λx. sq x}. A node with an effective computable function normally is a leaf in LDF Database 44a. However, The node itself has the responsibility of supporting data accesses from users that are about the properties of the function. The properties are presented in the logical sub LDF database under the node. The ability of managing effective computable functions enable LDF Database 44 to manage mathematical expressible functions that have infinite data. An example of this type of nodes are given in the later section "Operations of the Invention".

As mentioned in "Summary of the Invention", a specification of a data access in Functional Specification 50 is equivalent to an effectively computable function. If it is too long to be passed though the message channel 53 with a limited throughput, it can be replaced by a procedure call, and the real body of the specification can be stored in the database 44a as an effectively computable function. The stored specification will be eventually executed after the corresponding procedure call is invoked.

4. NULL, that is, there is no value for the node. A node can be present in LDF without value. A node without value can imply that the value of the node is not ready yet, and could be available later. Or a node without value implies that is a non solid leaf. Theoretically, the value of the node shall be the function that abstracts the combination of its both solid descents and dash descents. The function is a restriction (a subset in terms of domain) of the corresponding function defined in the data schema. However, it is not possible and not necessary to give the precise definition of the function in managing discrete data. Another embodiment of this invention is that a non solid leaf can be assigned with a meaningful value other than NULL.

3. Constraints over databases

To keep the databases of this invention consistent with the properties of lambda-definable functions, the constraints below shall be imposed over the databases as a preferred embodiment of this invention:

1. A link must have two nodes at its two ends.
2. A node has a RDN in it, and the RNDs of all the nodes under a solid head shall be distinguishable.
3. An node can have no links connected to it. But there is at most one solid link whose arrow is pointing away from it, and there is at most one dash link whose arrow is pointing away from it.
4. Starting from a node, one would never travel back to the same node by taking directed links (either solid or dash exchangeablly) in the direction that the corresponding arrows points to.

Figure 5:
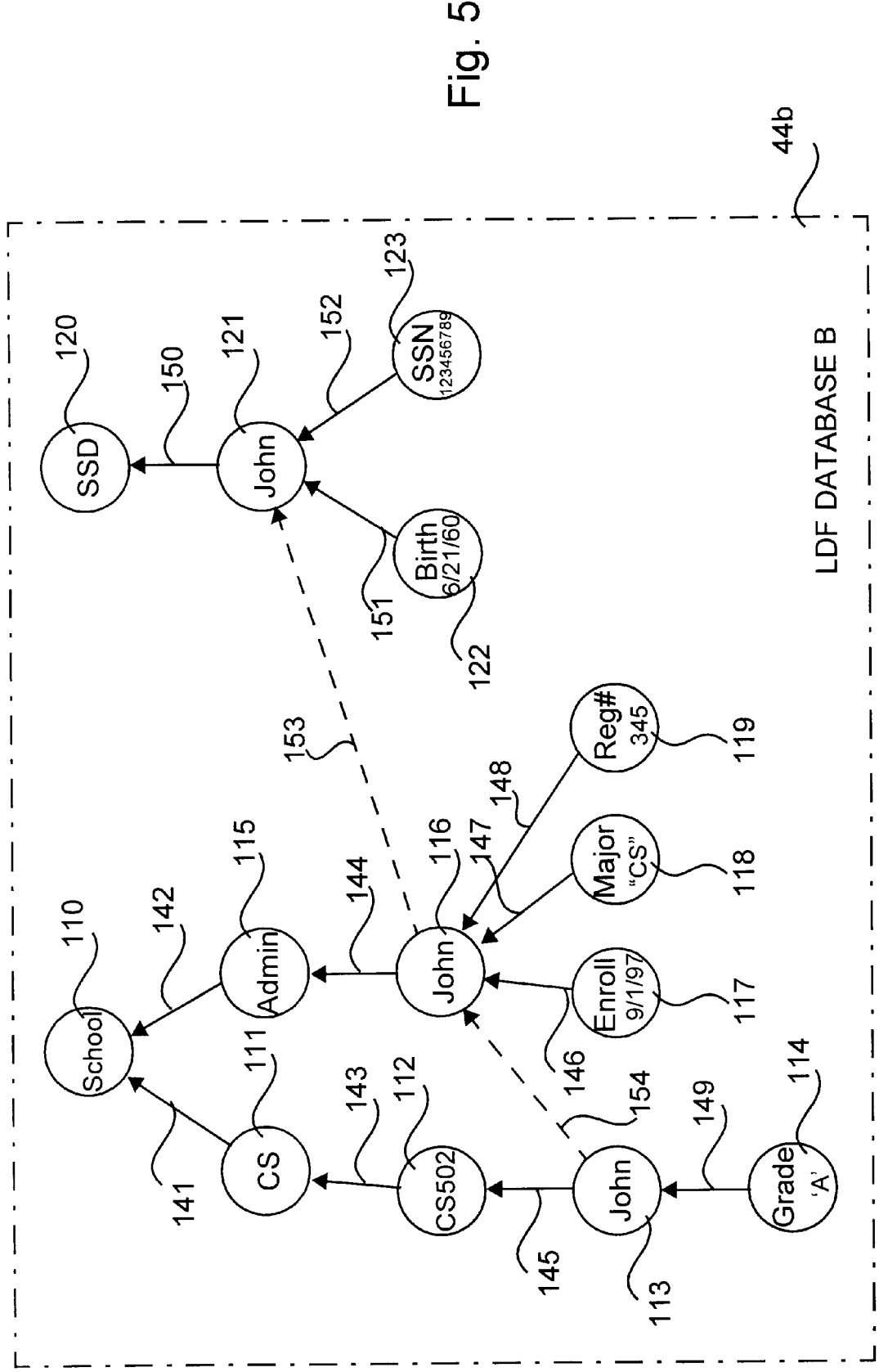
FIG. 5 shows a database of a school administration system as a typical database application which shows that a database of this invention organizes the related data in the way closely related to the nature of the database application itself in the reality.

A school administration database system is illustrated in FIG. 5 as another example of LDF Database 44b of this invention. This school database application organizes its related data by the nodes and links of this invention. School 110 consists of CS department 111 through link 141 and Administration Office 115 through link 142. Class CS502 112 consists of a student John 113 through link 145, whose grade Grade 114 is valued 'A' through link 149. Administration Office 115 manages a student John 116 through link 144, whose Enrollment Date 117 is Sep. 1, 1997 through link 146; Major 118 is "CS" through 147; and Registration Number 119 is 345 through link 148. Beside the School 110, Social Security Department SSD 120 is pre-existed, and it has record John 121 through link 150. John 121 was born at Birth Date 122 (the value is Jun. 21, 1960) through link 151; his Social Security Number SSN 123 through link 152 is 123456789. Nodes John 150, 116, and 145 are related data about John. They are related through dash links 153 and 154.

OPERATIONS OF THE INVENTION

This section describes the operations of the invention. In the sub-section "Global indentifiers", Distinguished Names are defined so that a node can be globally identified both by users through message channel 51, 53, and 54 and by LDF DBMS 45. In the sub-section "Data schema", a effectively computable (lambda-definable) function is used to specify the constraints or rules of a database application. Section "Database Evolution" introduces a set of minimum operations that change the states of databases. Section "Queries" gives a few examples to illustrate that a set of built-in operators and a functional programming language can satisfy all queries from users.

1. Global Identifiers

Related Distinguished Names (RDNs) are used to identify the nodes under a solid head, but they are not globally distinguishable in the entire LDF Database 44. A globe naming scheme shall be used so that each node in the database is distinguished. As a preferred embodiment of this invention, a LDF Database takes Distinguished Names (DNs) as the global identifiers of nodes. LDF DBMS 45 shall be able to locate the corresponding node according to a distinguished name provided through message channel 51, 53, and 54.

The distinguished name of a node is the sequence of the RDNs of all of its solid ancestors starting from the solid root to the given node. This sequence is delimited by delimiters. The choices of delimiters are various, for example, slash '/', space ' ', or the pair of square brackets []. In this description, the pair of square brackets [] are used as the delimiters. In FIG. 3, nodes 61–68 have their DNs [A], [[A]B], [[[A]B]C], [[A]D], [[[A]D]H], [E], [[E]F], and [[[E]F]G] respectively.

2. Data Schema

Figure 1:
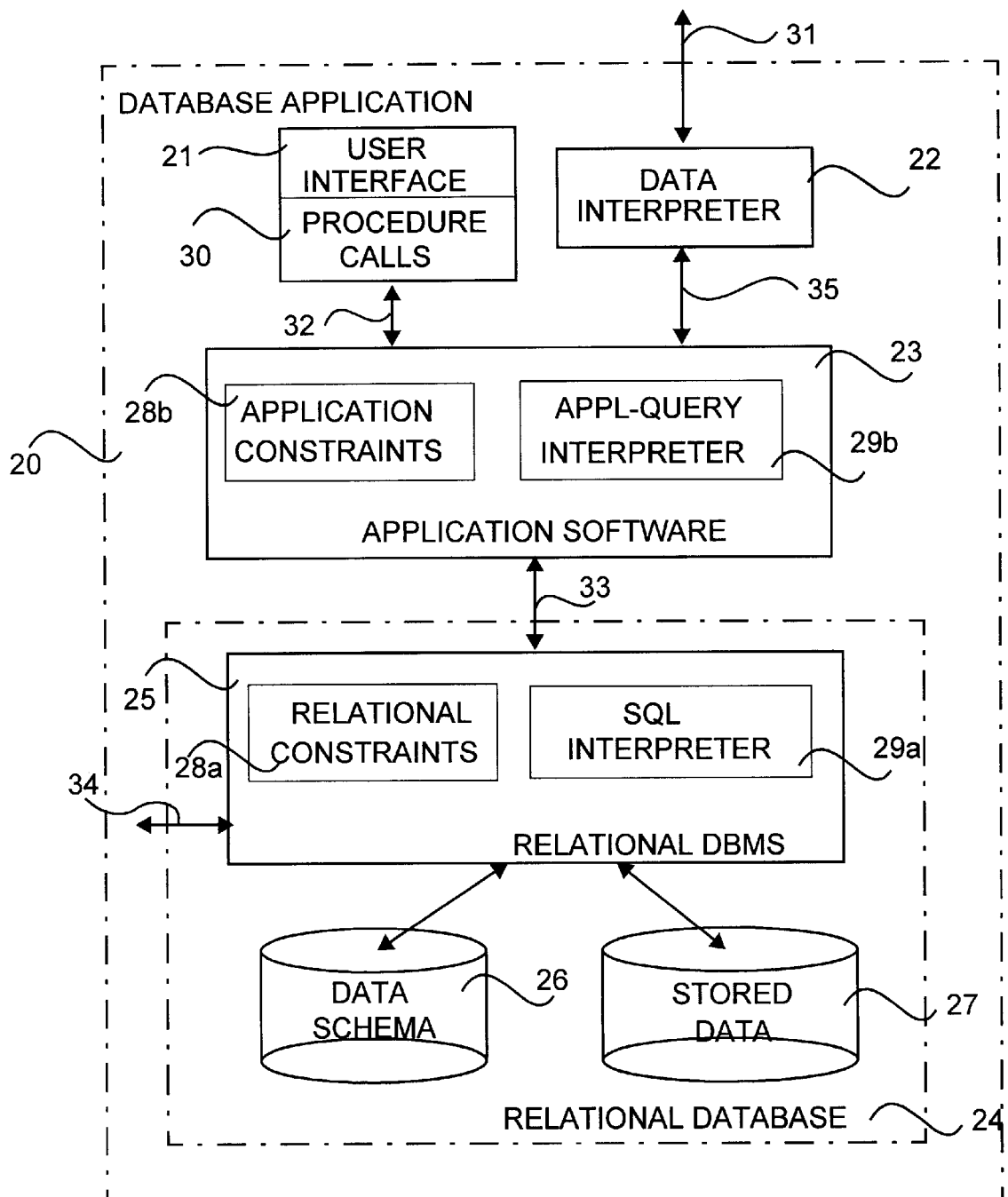
FIG. 1 shows a typical system architecture of a traditional database application in the prior art, in which the vendor must develop expensive application-dependent software.
Figure 2:
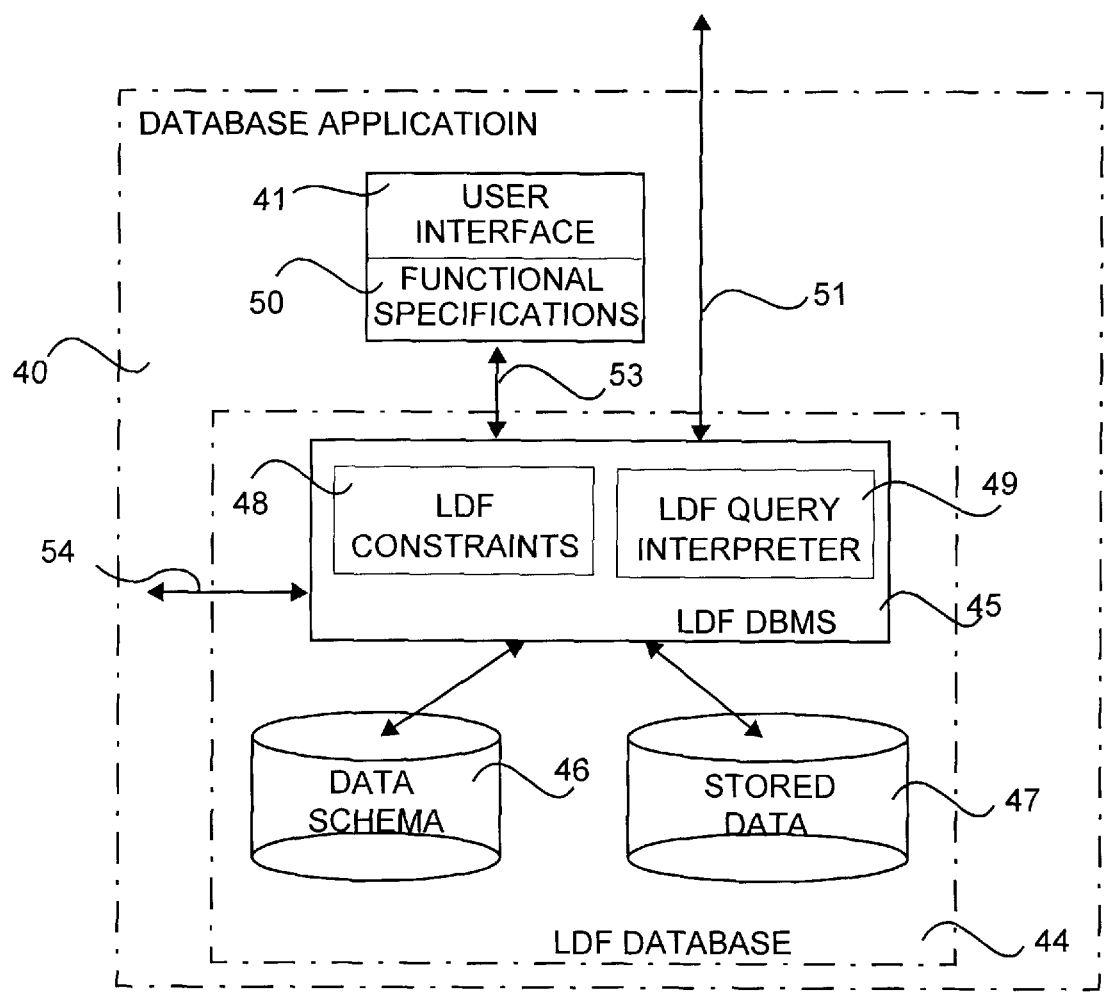
FIG. 2 shows a typical system architecture of a database application of this invention in which the database application comprises only a database of this invention and high-level functional specifications in a functional programming language.

As a preferred embodiment of the invention, the data schema in Data Schema 46 of FIG. 2 is a set of lambda-definable functions that specifies the rules over Database Application 40. More precisely, the set of lambda-definable functions defines the super set of nodes (or the domain of a LDF Database) that are allowed to be instances in the LDF Database. The data schema is entered through the message channel 54.

For a mathematical expressible function, the data schema is the function itself in the typed lambda calculus. For example, the square function F(x) sq x has the data schema: F=λx:N. sq x, where F is the name of the function; the symbol ≡ is the special symbol for the function name F at its left-hand side to be assigned to the function at the right-hand side; 'λ' is the special symbol in lambda calculus that indicates the symbol 'x' following 'λ' is a non-free variable; 'N' means that the variable 'x' is bounded to be the domain of integers; "sq" is the built-in function for the function square; and the symbol 'x' following "sq" is the parameter of "sq".

Data schemata for discrete data are usually identity functions. As an example, the data schema of the school administration database application in FIG. 5 is given in FIG. 6. In FIG. 5 and 6, Line 160 gives the overall identity function of Social Security Department, where node SSD 120 can have all residents in U.S.A. as its solid tails. Line 161 defines that each resident has two attributes birth date and Social Security Number, where the RDN of the resident node, as John 121, shall be either entered by users or automatically generated by the system. Lines 162 and 163 describe that the birth date and the social security number are named Birth and SSN as RDNs; and their formats are dates (D), and Integers (N) respectively. Line 164 defines that a university node can be named by users or the system as the RDN as node School 110; and a university consists of one administration office and multiple departments in the university. Line 165 names Admin as the RDN of the administration office; and the node Admin 115 consists of multiple students who are from the residents registered in SSD. Line 166 says that a student can be registered in a RDN provided by users or the system; and he/she have attributes enrollment date, major, and registration number. Line 167–169 give the RDNs Enroll, Major, and Reg#; and the corresponding data formats Date (D), string (S), and integer (N) respectively. Line 170 defines that a department can have its RDN provided by users or the system; and it consists of multiple classes. Line 171 defines that a class can be named by users or the system; and it consists of multiple students who are from the registered students in the administration office. Line 172 defines that a student in a class can be named by users or the system; and he/she has one record grade. Line 173 says that the grade is named Grade and it is a character (C).

Figures 7, 8:
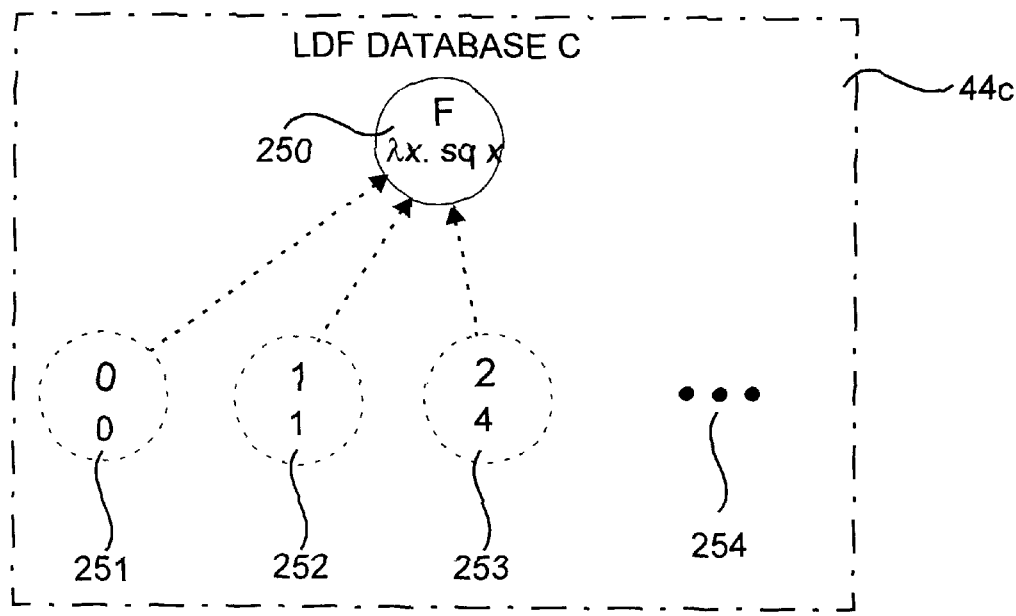
FIG. 7 shows a data schema that allows a recursive structure to recursively extend their hierarchical levels without limitation in a database.
FIG. 8 shows a database storing a single node with a lambda-definable function as its value which shows that a database with limited physical storage can exhibit infinite information.

Another example is to define the data schema for recursive part assemblies. An assembly consists of a set of (zero or multiple) units, and a unit is either an assembly recursively, or a non-dividable part. And it is uncertain that how many hierarchical levels the assembly has. FIG. 7 gives the data schema of the generic assemblies. Line 201 defines an assembly as a set of units. Line 202 defines a unit as either an assembly or a part. This recursively defines that an assembly can have a infinite number of hierarchical levels, while a instance of databases has a finite number of hierarchical levels. Line 203 is an incomplete definition for a part (a part can have its a number of properties, and a part belongs to one of multiple types of parts).

3. Databases Evolutions

Once the Data Schema 46 is entered, it is ready to construct and maintain LDF Database 44 so that LDF Database 44 reflects the reality of the database application 40. There are many ways to accomplish the processes of data accesses. However, the following sub sections are provided as one of the possible ways for illustration.

3.1 Creation

In response of a creation request from users through message channel 51 or 53, LDF DBMS 45 shall be able to insert a new node into the corresponding position in LDF Database 44. The input of the creation request shall include the DN of the solid head of the new node if it is a non-solid root; the DN of the dash head of the new node if it is a non-dash root; the RDN of the node; and the value of the node. If the RDN is not provided, the LDF DBMS shall be able to generate a unique RDN under the solid head for the node. The value of the node is optional. This indicates that the value is not available so far, but will be available in the future; or this node is a non-solid leaf.

LDF DBMS 45 supports a built-in operator to accomplish the creation process. This built-in operator will validate the input data against the data schema 46, and the existing data in LDF Database 44. If the input is valid, LDF DBMS 45 will accept the request, and permanently keep the new node in the LDF Database 44 in its right position. Otherwise, LDF Database 44 will do nothing but reject the request.

LDF DBMS 45 shall also be able to accept a creation request of multiple nodes as an entire complex objects. For example, the creation of node John 121 under SSD 120 in FIG. 5 is intended to have nodes Birth 122 and SSN 123 created.

If the value of a created node is a mathematical expressible function that has infinite nodes in its recursive enumeration, then the recursive enumeration is logically a part of the entire database. FIG. 8 illustrates a LDF Database 44c with a single node 250. However it illustrates infinite nodes including 251, 252, and 253, where the object with three dots 254 indicates that there are infinite number of nodes under 250. The LDF Database 44c having a single node supports infinite queries regarding the function in node 250.

3.2 Deletion

In response of a deletion request from users through message channel 51 and 53, LDF DBMS 45 shall be able to remove the related nodes from LDF Database 44. The input of the deletion request shall include the DN of the node from which the related nodes are to be deleted.

LDF DBMS 45 supports a built-in operator to accomplish the deletion process. This built-in operator will validate the input data against the existing data in LDF Database 44. If the input DN is valid, LDF DBMS 45 will accept the request, and permanently remove the collection of the nodes collected from the following procedure:

1. Put the node in the input into the collection, mark it as UN-COUNTED.
2. Starting from a UN-COUNTED node in the collection, find all the solid tails and put them into the collection. And starting from the same node, find all the dash tails and put them into the collection. Mark the starting node as COUNTED.
3. If there is no more UN-COUNTED node, terminate the procedure. Otherwise, repeat step 2.

The above procedure guarantees that all of the related data is removed from the database, which reflects the reality of the Database Application 40. For example, in FIG. 5, John's quitting from the school implies the deletions of all John's related records: John 121, Birth 122, SSN 123, John 116, Enroll 117, Major 118, Reg# 119, John 113, and Grade 114. The collection of the nodes from the above procedure is called the biography of the given node in the input, and a mathematical equation is precisely given in the setion "Theory of the Invention".

3.3 Update

A built-in operator is provided by LDF DBMS 45 to accomplish node update operations. A update operation can add or replace the value of a node. For example, change the grade 114 from "A" to "B" for John 113 in the class CS502 112. More complicated updating operations are allowed. For example, multiple nodes are updated according certain criteria; a dash head is assigned to a given node; and relocating a sub trees (solid or dash) is also possible. However, these operations must not violate the database constraints specified in the section "Structure of the Invention", and must not violate the data schema 46.

Operations creation, deletion, and update provide means for users to maintain the LDF Database 44 to be consistent with the reality of the Database Application 40. The Database 44 under the operations remains its integrity. This means that Database 44 is still enumerations of a set of lambda-definable functions. Because LDF Database 44 varies under the operations with the time, it can not be equivalent to the enumeration of its functions defined in the data schema 46. However. The enumerations of the set of functions (LDF Database 44) is a restricted subset of the enumerations of the functions defined in the data schema 46. For more detailed discussion, see the later section "Theory of the Invention".

4. Queries

There are many different languages that can be used to support queries. One query language uses predicate calculus as the base. In the calculus-based query language, the entire database 44 is treated as a partially-ordered set with the binary relations: $<, <=, ==, >=, >, \sqsubset_r, \sqsupset_r, \sqsubseteq_r, \sqsupseteq_r, \equiv, \sqsubset_d,$ $\sqsupset_d, \sqsubseteq_d,$ and $\sqsupseteq_d,$ where symbol $\equiv$ is used to indicate two identical nodes at its two sides. The calculus-based query language also has other regular operators such as or $\vee$, and $\wedge$, negation $\neg$, union $\cup$, intersection $\cap$, and difference $-$. The output of a query is the set that satisfies the predicate calculus in the input. The calculus-based query language supports most of queries that users frequently need. For example, print all of the solid and dash tails under [[SSD] John] in FIG. 5; the query can be expressed in predicate calculus as $$\{x | \exists y:(y \sqsupset_r [SSD] \wedge y.RDN==John \wedge (x \sqsupseteq_r y \vee x \sqsupseteq dy))\}$$

The output of this query will include nodes 121, 122, 123, 116. Another example is "find all the students who take class CS502 and have Grade 'A'" in FIG. 5. The expression is:

$$\{x | x \sqsupset_r [[[School]CS]CS502] \wedge (\exists y:(x \sqsubset_r y \wedge y.RDN== Grade \wedge y.value=='A'))\}.$$

The output will include node 113.

The calculus-based language supports not only the queries that SQL supports, but also certain least fixed point queries that are not supported in SQL. For example, the calculus-based language can retrieve information about the downstream solid descents of a LDF database that has the data schema defined in FIG. 7.

Another query language of LDF DBMS 45 uses a functional language as its language that provides the full query capability of LDF DBMS 45. In the calculus-based query language, the output of a query is a set of nodes. Sets cannot completely deliver information the users may need. For example in FIG. 9 that gives a finite acyclic directed graph with nodes A 301, B, 302, C 303, D 304, E 305, and F 306, users want to find a sequence of nodes that have path from node A 301 to node D 304. This sequence of nodes (A:B:C:D) not only includes the set of nodes, but also lists the nodes in the sequence. A query of the calculus-based query language cannot support this, but the function-based query language is able to support this. The function-based query language can re-organize data of the output in a way that users want. For example, users can write a query language that requests the directed path from A 301 to D 304 to be printed in a list, or a query language that requests the directed path to be represented by a new LDF database which may further be used for another query.

Figure 9:
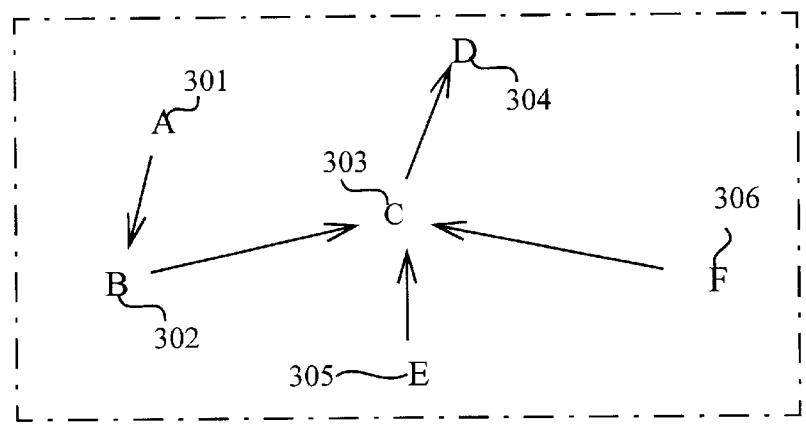
FIG. 9 shows an acyclic directed graph.
Figure 10:
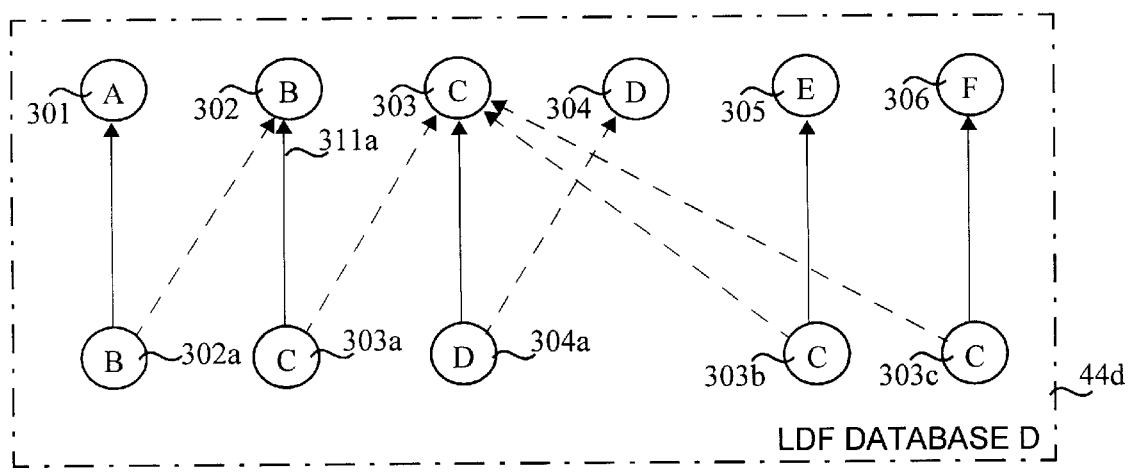
FIG. 10 shows a corresponding database of this invention for the directed graph in FIG. 9.

FIG. 10 gives the LDF Database 44d of the directed graph in FIG. 9. In FIG. 10, nodes A–F (301–306) are the set of solid roots that represents nodes in FIG. 9; and node B 302a is the solid tail of A 301 and dash tail of B 303 that indicates the directed connection relationship between A 301 and B 302. Similarly, C 303a, 303b, and 303c, and 304a are the nodes used to indicate directed connection relationships of the corresponding nodes. From LDF Database 44d of FIG. 10, many advanced queries are written in the following as examples. For illustration, the syntax is taken from an applied lambda calculus described in the book "Programming Languages—Concepts and Constructions" by Ravi Sethi, Addison-Wesley Publishing Company, 1987, in which symbols from predicate calculus are used in the conditional clauses as built-in operations.

Query 1: is there a directed connection between two nodes x and y?

The query in the functional programming language is written as:

isConnected=$\lambda$xy.if$\exists$z:(z$\sqsubset_r$ x $\wedge$ z$\sqsupseteq$dy) then TRUE else FALSE.

In English, this function with two nodes x and y as parameters specifies that if there is a node in LDF Database 44d such that the node is a solid tail of x and a dash tail of y, then there is a direct link from x to y.

Query 2: is there a path from node x to node y?

The query in the functional programming language is written as:

isPath=$\lambda$xy. if isConnected x y then TRUE; else
if $\exists$z: (isConnected x z $\wedge$ isPath z y) then TRUE; else FALSE.

In English, it specifies that if x has a directed link to y, then there is a path from x to y; or if there is another node z in LDF Database 44d such that x has a directed link to z and there is a path from z to y, then there is a path from z to y; or there is no path from x to y.

Query 3: print in a list a sequences of the nodes that form a path from node x to node y.

The query in the functional programming language is written as:

path=$\lambda$xy. if isConnected x y then [x, y]; else
if $\exists$z:(isConnected x z $\wedge$ isPath z y) then [x z]:(path z y); else [].

In English, it specifies that if x has a directed link to y, then the list is [x, y]; else if there is another node z such that x has a directed link to z, and there is a path from z to y, then the list is [x, z] concatenated by (path z y); otherwise the list is empty.

THEORY OF THE INVENTION

Set theory and lambda calculus are used to develop a form of enumerations (called recursive enumeration) for lambda-definable functions. Consequently, a database is mathematically defined as the recursive enumeration of a lambda-definable function, which is a generalization of the EP data model proposed in [XuBhar96]. In Section 1, some related concepts of lambda calculus are reviewed. Section 2 describes the concept of recursive enumerations and claims that any lambda expression has its recursive enumeration. The properties of recursive enumerations of lambda-definable functions given in Section 3 establish the invariants of databases, which provide databases under lambda-definable functions with a set of built-in partial-ordered relational operators, and make a database management system possible to manage a very large volume of data. Section 4 gives the precise definitions of data schema and database, and claims that any database is the recursive enumeration of a lambda-definable function. To make databases self-sufficient, we introduce some update operations in Section 7 which provide necessary means for databases to keep track of the time-varying world.

1. Lambda Calculus

In this section, the notations commonly used in lambda calculus are reviewed, which will be the base for the concept of recursive enumerations introduced in the next section. In addition to the notations reviewed below, readers are assumed to be familiar with the notations used in set theory. For example, a pair of braces {} is used to surround a set of elements, φ for an empty set, a pair of angle brackets <>; for pairs in a binary relation such as in <x, y>, inclusion ∈, subset ⊆, or ⊂, union ∪ as in A ∪ B or in $$\bigcup_{y \in dom\, x} F(y),$$

intersection ∩, and difference −.

In lambda calculus theory, a lambda-definable function is expressed by a lambda expression according to the following syntax:

$$e ::= x | e_1 e_2 | \lambda x.\, e \qquad (1)$$

Where the symbol x is a constant. A constant is represented by a built-in symbol which represents an "atomic" object such as an integer, a string, a character, a function unknown to a given system, or any user-defined object. Expressions of form λx.e are called abstractions, where x and e are respectively called the bound variable and the body of the abstraction λx.e. Expressions of the form ($e_1$ $e_2$) are called applications, where $e_1$ and $e_2$ are respectively called the rator and the rand of the application ($e_1$ $e_2$).

A noteworthy attribute of lambda calculus we utilize in this description is its restriction to functions of one argument. In other words, any lambda expression can only be expressed as (x), λx. (e), or (($e_1$) $e_2$). A function taking multiple arguments can be curried into one-argument lambda expression. For readability, we will optionally drop off parentheses surrounding lambda expressions wherever there is no ambiguity; for example, $e_1$ $e_2$ $e_2$ is equivalent to ((($e_1$) $e_2$) $e_3$), and λx. λy. e is equivalent to (λx. (λy. e)).

A lambda expression is in normal form if it cannot be further reduced by using β-reduction or η-reduction. According to the corollary of Church-Rosser Theorem I, no lambda expression can be converted to two distinct normal forms (ignoring differences due to α-conversion). In other words, the normal form of a lambda expression is unique if it exists. Church-Rosser Theorem II states that if a lambda expression has its normal form, then there exists a normal-order reduction from the lambda expression to its normal form. In this description, our concern is not how to obtain the normal forms from lambda expressions, but what the normal forms of lambda expressions are if they exist. Therefore, we will use notion ν e to denote the normal form of a lambda expression e. For more information about lambda calculus, readers can refer to [Stoy77], [Hudak89].

A set of built-in constants is introduced in this description. For example, sq symbolizes the square function from integers to integers; The constants if, then, and else are for "if ... then ... else" logic implications; The constants case of and → are for case expressions "case of . . . : . . . →. . . ;"

In the section "Theory of the Invention", notations from typed lambda calculus are also used if necessary, where the bound variable x in λx.e has its domain expressed. For example, λx. e, where the domain of x is non-negative integers, is represented by the typed lambda expression λx:N.e, where N stands for the non-negative integers. In this description, we will use S for the domain of strings, N for non-negative integers, D for dates, and C for characters. The domains of bound variables also can be represented by extensive sets, e.g., {a, b, c}, or by comprehensive sets, e.g., {a|a satisfies a set of conditions}. Each element in extensive sets or comprehensive sets can be further defined as a typed lambda expression. For more information about typed lambda calculus, please see [Meyer90].

2. Recursive enumerations of lambda-definable functions

A theorem in [HopUll79] states that if a function is recursively enumerable, or equivalently a function is a partial recursive function, then there is a Turing machine which enumerates each image in the range of the function exactly once. By Church's theory, the class of lambda-definable functions is equivalent to the class of effective computable functions or partial recursive functions. Therefore, we can always give an enumeration for a lambda-definable function. The term enumeration in [Stoll63] is defined for denumerable sets, and is defined for the one-to-one correspondence of the set of nature numbers with a denumerable set. Normally, the enumeration of a lambda expression λx.e refers to the collection of the applications of λx.e by applying it to all of the elements defined in the domain of the bound variable x. In the section "Theory of the Invention", however, an enumeration in a special form (called the recursive enumeration) of a lambda expression has different meaning from the common-sense enumeration of the lambda expression mentioned above. In this section, the syntax of lambda expressions is extended to include expressions like C≡e. Then several functionals including recursive enumeration which are the core concepts are defined. Finally, it is proved that any lambda-definable function has its recursive enumeration.

In order to present multiple occurrences of a single lambda expression either as rators or rands in applications, the symbol ≡ is introduced, which means that a name (tag) is assigned to a lambda expression. For example, F≡λx. sq x, and π≡3.1415926 are allowed lambda expressions. Therefore, the extended lambda expressions have the following syntax:

$$e ::= x | C \equiv e | \lambda x.e | e_1 e_2 \qquad (2)$$

Where C is the name (or tag) of lambda expression e. C can be a constant, or a distinguished name defined later. Two restrictions must be forced when a lambda expression C≡e is defined:

I. if C is a constant, it can be chosen arbitrarily, but an identical lambda expression cannot have different names;

II. if C is a distinguished name, then C and e must be the distinguished name and the corresponding value of a recursive application from the union of the recursive enumerations of a set of lambda expressions.

In the above restriction II, a few new terms were mentioned. Readers can skip them for the time being, and review them later after the new terms are formally defined.

Expression C≡e is nothing more than e itself in terms of the semantics of lambda calculus theory. But an occurrence of the lambda expression C≡e through its name C in an application identifies the participation in constructing the application, and implies the dependence of the application upon the lambda expression C≡e. The name C of the expression e will play an important role in constructing dependent relationship defined in Section 5.

The first functional to be defined is related distinguished name (RDN), denoted as ρ:

$$\rho = \lambda y. \text{ case } y \text{ of} \tag{3}$$

$$x \to \text{'}x;$$

$$\lambda x.e \to \text{'}(\lambda x.e);$$

$$C \equiv e \to \text{'}C;$$

$$e_1 e_2 \to \text{'}(e_1 e_2);$$

where, y is a lambda expression with the syntax defined in (2); and the quota at the front of a expression indicates the syntactical form of the expression itself. Therefore, the functional $\rho$ is a function taking a lambda expression as its argument, and the result is the concrete syntactical form representing the lambda expression, called the related distinguished name of the lambda expression. The functional $\rho$ is also overloaded by allowing it to take a recursive application as the argument (see more description below).

The functional v takes a lambda expression as its argument, and converts the lambda expression to its unique normal form if it exists, as we mentioned in Section 2. We simply use $$v \; e \tag{4}$$

to denote the normal form of an expression e. The normal form of expression $C \equiv e$ is defined to be the normal form of e itself, that is, $$v(C \equiv e) = v \; e. \tag{5}$$

The core functional of this theory to be defined is recursive enumeration, denoted as $\Psi$:

$$\psi = \lambda x. \text{ case } x \text{ of} \tag{6}$$
$$exp \to \psi \langle [\rho \; exp], v \; exp \rangle;$$
$$\langle f, exp \rangle \to \text{case } exp \text{ of}$$
$$\quad y \to \{\langle f, exp \rangle\};$$
$$\quad exp_1 exp_2 \to \{\langle f, v \; exp \rangle\};$$
$$\quad \lambda x.e \to \{\langle f, exp \rangle\} \cup \bigcup_{y \in \text{dom } x} \psi \langle [f: \rho(y)], v([y/x]e) \rangle.$$

In the above equation, a few notations as constructors are used to construct new objects. That is, a pair of elements surrounded by a pair of angle brackets $\diamond$ becomes a recursive application; and an expression surrounded by a pair of square brackets [ ] becomes a distinguished name. In addition, a pair of braces { } is used to construct a set by surrounding a collection of elements; the colon ':' is used to concatenate two elements together in the expression $f:\rho(y)$; the expression [y/x]e represents the consequence of the substitution of y for x in expression e; the symbol f is used to represent a distinguished name; and the expressions e, exp, exp1, and exp2 are used specially to represent lambda expressions with syntax given in (2).

Speaking in English, the functional $\Psi$ is a function taking either a lambda expression or a recursive application as its argument, and an application of $\Psi$ is a set of recursive applications. If $\Psi$ takes a lambda expression e as the argument, then the application $\Psi$e is called the recursive enumeration of e. For example, the recursive enumeration of the lambda expression $F = \lambda x. \text{ sq } x$, where x $\in$ N, is $\{<[F], \lambda x. \text{ sq } x>, <[F]0, 0>, <[F]1, 1>, <[F]2, 4>, \ldots, <[F]i, \text{ sq } i>, \ldots \}$ for all i$\in$N. If $\Psi$ takes a recursive enumeration p as the argument, then the application $\Psi$p is called the recursive enumeration of p. For example, the recursive enumeration of the recursive application $<[F], \lambda x. \text{ sq } x>$, where X$\in$N (integers), is $\{<[F], \lambda x. \text{ sq } x>, <[[F]\_0], 0>, <[[F]1], 1>, <[[F]2], 4>, \ldots, <[[F]i], \text{ sq } 1>, \ldots \}$ for all i$\in$N Each recursive application p is a pair of elements, where the first coordinate (p^1) is the distinguished name of p and the second coordinate (p^2) is called the normal form or the value of the p. If p^1 consists of a related distinguished name, e.g., p exp, preceded or not preceded by another distinguished name, then the related distinguished name $\rho$ exp is also called the related distinguished name of p, denoted as $\rho$ p (=$\rho$exp). If p^1 consists of $\rho$ exp, not preceded by a distinguished name, then this recursive application is called an application root.

Usually, an application of an abstraction refers to the combination of the abstraction with another lambda expression from the domain of the bound variable, e.g., $(\lambda x.e)$ y, where y$\in$dom x. Here, however, a recursive application in a recursive enumeration represents the combination of a abstraction with no lambda expression or multiple lambda expressions, e.g., e or e $x_1, x_2, \ldots, x_1$, where i is a positive integer. If a given lambda expression e combines with no lambda expression, then the recursive application of the expression e is the pair $<[\rho \; e], v \; e>$. And we call this special recursive application the application root. Inductively, if a recursive application is $<f \; \lambda x.e>$ after the $(i-1)^{th}$ recursive application of e, where f is the distinguished name and $\lambda x.e'$ as an abstraction is the normal form of the resulting lambda expression $(\ldots (e) \; x_1) \ldots) \; x_{i-1})$, then the pair, $<[f: (\rho \; x_i)], v([x_i/x]e')>$ for an application of $\lambda x.e'$, e.g., $(\lambda x.e')x_i$, where $x_i$ is from the domain of the bound variable x, is also a recursive application. This recursive application is actually the $i^{th}$ recursive application of e with the resulting lambda expression $(\ldots (e) \; x_1) \ldots) \; x_{i-1}) \; x_i)$.

Therefore, the recursive enumeration of a lambda expression is the union of all the recursive applications of the lambda expression. In other words, we recursively describe the recursive enumeration of a lambda expression in English as:

I. if the lambda expression has no normal form, then the recursive enumeration is $\phi$; In (6) $<f, v \; exp>$ will become $\phi$ if v exp has no normal form.

II. if its normal form is not an abstraction, then the recursive enumeration has the recursive application representing the lambda expression itself as the only element; or III. if the normal form is an abstraction, then the recursive enumeration is the union of the recursive application representing the lambda expression itself with the recursive enumerations of the recursive applications representing the applications of the abstraction applied to all the defined rands of the bound variable in its domain, e.g., y$\in$dom x.

In the description III above, a rand y (y$\in$dom x) of the bound variable x can be a lambda expression like $C \equiv e$, and C and e are from the distinguished name and the corresponding value of a recursive application. The participation of a recursive application as a rand in another recursive application through $C \equiv e$ is an important means to establish the dependent relationship between the two recursive applications (see more in Section 6).

Another noteworthy point is that the term "recursive enumeration" is different from the term "recursively enumerable". That a set is recursively enumerable means that the set is $\phi$ or the range of a recursive function [Stoll63]; that a language is recursively enumerable means that it can be accepted by a Turing machine [HopU1179]; or equivalently that a function is recursively enumerable means that it is a partial recursive function. The term "recursive enumeration"

in this description, however, refers to the functional $\Psi$ defined in (6), or an application of $\Psi$.

We end this section by claiming that any lambda-definable function has its recursive enumeration. Although neither equation (6) nor the following theorem gives a complete procedure to enumerate the recursive enumerations of certain partially recursive functions, we at least know that any lambda-definable function has its recursive enumeration, and there exists a Turing machine to generate the recursive enumeration. More specifically, although the Turing machine to generate the recursive enumeration of a non-total recursive function never halts, it generates the recursive enumeration on its output tape. For a given expression <f v exp>, if v exp exists, the Turing machine eventually be able to calculate the normal form according to Church-Rosser Theorem II; or the Turing machine will never halts, and write nothing on the output tape.

Theorem 1: Any lambda-definable function has its recursive enumeration.

The proof is obvious. The recursive enumeration of a lambda-definable function given in expression (6) is expressed by a lambda expression; therefore, it is a lambda-definable function. According to Church's theory, any lambda-definable function is an effectively computable function, or equivalently a partial recursive function. Therefore, by applying the function $\Psi$ to a lambda expression e as an argument, we can compute the output of the application $\Psi$e, which is the recursive enumeration of the lambda expression e.□

4. Properties of recursive enumerations

In this section, we summarize the properties of recursive enumerations. These properties are the invariants of a database defined in Section 5, which must be protected by a database management system. These properties offer potential abilities of databases defined under lambda calculus in advanced query languages and in the implementation of a very large amount of information.

Before the properties of recursive enumerations are introduced, the following binary relations are formally defined under the union of the recursive enumerations of a set of lambda expressions:

I. If the distinguished name of recursive application $p_2$ consists of the distinguished name of $p_1$ followed by its related distinguished name, then $p_1$ is the rator of $p_2$ ($p_1 \sqsubseteq_r p_2$); and correspondingly, $p_2$ is an application of $p_1$ ($p_2 \sqsupseteq_r p_1$). If a recursive application has no further rator, it is called the application root (as we defined before).

II. If $p_1$ is identical to $p_2$, or $p_1 \sqsubseteq_r p_2$, or there exists a sequence of recursive applications $q_1, q_2, \ldots, q_n$ (where n is a positive number), such that $p_1 \sqsubseteq_r q_1$, $q_1 \sqsubseteq_r q_2, \ldots, q_{n-1} \sqsubseteq_r q_n$, $q_n \sqsubseteq_r p_2$, then $p_1$ is a recursive rator of $p_2$ ($p_1 \sqsubseteq p_2$); and correspondingly, $p_2$ is a recursive application of $p_1$ ($p_2 \sqsupseteq_r p_1$).

III. If the distinguished name of $p_1$ is the related distinguished name of $p_2$, where the distinguished name of $p_2$ consists of another distinguished name concatenated by the related distinguished name, then $p_1$ is the rand of $p_2$ ($p_1 \sqsubseteq_d p_2$); and correspondingly, $p_2$ is the image of $p_1$ ($p_2 \sqsupseteq_d p_1$). If a recursive application has no rand existing in the recursive enumerations, then it is called an image root.

VI. If $p_1$ is identical to $p_2$, or $p_1 \sqsubseteq_d p_2$, or there exists a sequence of normal mappings $q_1, q_2, \ldots, q_1$ n (where n is a positive number), such that $p_1 \sqsubseteq_d q_1$, $q_1 \sqsubseteq_d q_2, \ldots, q_{n-1} \sqsubseteq_d q_n$, $q_n \sqsubseteq_d p_2$, then $p_1$ is a recursive rand of $p_2$ ($p_1 \sqsubseteq d\ p_2$); and correspondingly, $p_2$ is a recursive image of $p_1$ ($p_2 \sqsupseteq d\ p_1$).

The terms rator, application, rand, and image are normally used to indicate relationships among lambda expressions, as we recalled in Section 2. Because a recursive application actually represents a lambda expression (its syntactical expression is in the distinguished name, and its normal form is in the value), these terms are overloaded in I and III above by allowing them to indicate relationships among recursive applications. In definition II, we call p2 a recursive application of $p_1$ if $p_2 \sqsupseteq r\ p_1$ in a recursive enumeration. In the definition of recursive application given in Section 3, however, any element in a recursive enumeration is called a recursive application. Therefore, the definition of recursive application was overloaded not only against a recursive enumeration, but also against an element of a recursive enumeration. However, in order to avoid confusion, we call an element of a recursive enumeration as a recursive application, and always use $p_1 \sqsubseteq r\ p_2$ to symbolize that $p_2$ is a recursive application of $p_1$.

In definition III, if $p_1 \sqsubseteq d\ p_2$, then we can find another p' such that $p' \sqsubseteq_r p_2$. This implies that $p_1$ is rewritten as $p_1\hat{}_1=p_1\hat{}_2$ (in the form C≡e), and $p_2\hat{}_1$ is obtained by concatenating $p\hat{}_1$ with $p_1\hat{}_1$, and $p_2\hat{}_2$ is obtained by applying $p\hat{}_2$ to $_1\hat{}_2$.

If $p_1 \sqsubseteq r\ p_2$, then the distinguished name of $p_1$ is used to construct the distinguished name of $p_2$ (in the rest of the description, $p_1$ is called an innermost part, or a prefix of $p_2$). The partial relation $\sqsubseteq r$ reflects the dependence of a recursive application upon another recursive application through recursive rators. Similarly, if $p_1 \sqsubseteq d\ p_2$, then the distinguished name of $p_2$ is indirectly partially determined by the distinguished name of $p_1$ through the chain: $p_1 \sqsubseteq_d q_1$, $q_1 \sqsubseteq_d q_2, \ldots, q_{n-1} \sqsubseteq_d q_n$, $q_n \sqsubseteq_d p_2$. The partial relation $\sqsubseteq d$ reflects the dependence of a recursive application upon another recursive application through recursive rands, as we mentioned earlier.

In coincidence with the definition of $\sqsubseteq r$, if $p_2\hat{}_1$ has another distinguished name as an inner-most part, then there must exist another recursive application $p_1$ in a recursive enumeration such that $p_1\hat{}_1$ is equal to the innermost part of $p_2\hat{}_b$, and $p_1 \sqsubseteq r\ p_2$ (see Property 5).

Property 1: the recursive enumeration of a lambda expression is a function.

Proof: By the definition of recursive applications, a recursive application represents the mapping of a lambda expression (embedded in its distinguished name) to its normal form. And the normal form of a lambda expression is unique if it exists (Church-Rosser II). Therefore, there are no two recursive applications in a recursive enumeration such that they have the same distinguished name, but different values.□

Property 2. The recursive enumeration of a lambda expression is unique.

Proof. The recursive enumeration of a lambda expression e is defined as $\Psi$e. Since $\Psi$ is a function taking a lambda expression as its argument, the output of $\Psi$e must be unique to e according to the definition of functions.□

This property states that any lambda expression has only one recursive enumeration.

Property 3. the union of the recursive enumerations of two lambda expressions is a function.

Proof. If two lambda expressions are the same lambda expression, then the two recursive enumerations of the lambda expressions are the same according to Property 2. Therefore, the union of the two recursive enumerations is the same recursive enumeration, which is a function according to Property 1. If two lambda expressions are different, then the two distinguished names of the two application roots are different. Because the distinguished names of the two application roots are different, one recursive application in one recursive enumeration is differentiated from one recursive application in the other recursive enumeration. Therefore, the union of two recursive enumerations (each of them being a function according to Property 1) is simply the collection of the two recursive enumerations, and two recursive applications from different recursive enumerations cannot have the same distinguished name. In other words, there don't exist two recursive applications in the union of two recursive enumerations such that they have the same distinguished name, but different values. Therefore, the union of two recursive enumerations is a function.□

In Property 3, we assumed that different lambda expressions must take different symbols as their names in the form C≡e . Because different domains for a single lambda expression actually represent different functions, different symbols must be used for the corresponding functions. However, this assumption is not important, and is not followed in the rest of description (specifically in the proof of Theorem 2), as long as the union operation is not applied.

To show that the union of recursive enumerations is a set of trees under both $\sqsubseteq_r$ and $\sqsubseteq_d$, we defined that a set is tree-structured under a relation $\sqsubseteq$ iff for any element in the set e, either we can not find any other element e' such that e' $\sqsubseteq$ e (call e the root under $\sqsubseteq$); or there must exist exactly one and only one element e' in the set such that e' $\sqsubseteq$ e.

Property 4: The union of the recursive enumerations of a set of lambda expressions is tree-structured both under $\sqsubseteq_r$ and under $\sqsubseteq_d$.

Proof: The proof is given in two parts.
  I. Under $\sqsubseteq_r$. Given any recursive application r, 1), if there is no r' in the recursive enumeration such that r' $\sqsubseteq_r$ r, then r is a root in terms of $\sqsubseteq_r$. 2), if there are more than two recursive applications $r_1$, $r_2$ in the recursive enumerations such that $r_1$ $\sqsubseteq_r$ r, and $r_2$ $\sqsubseteq_r$ r, then the distinguished names of $r_1$ and $r_2$ must be identical according to the definition of the relation $\sqsubseteq_r$. Property 2 tells us that $r_1$ and $r_2$ are identical.
  II. Under $\sqsubseteq_d$. Given any recursive application r, 1), if there is no r' in the recursive enumerations such that r' $\sqsubseteq_d$ r, then r is a root in terms of $\sqsubseteq_d$. 2), if there are two recursive applications $r_1$ and $r_2$ such that $r_1$ $\sqsubseteq_d$ r and $r_2$ $\sqsubseteq_d$ r, then the distinguished names of $r_1$ and $r_2$ must be identical according to the definition of the relation $\sqsubseteq_d$. Then Property 2 tells that $r_1$ and $r_2$ are identical.□

Property 5. In the union of the recursive enumerations of a set of lambda expressions, if a recursive application is a root in terms of $\sqsubseteq_r$, then it must be an application root; And if a recursive application is a root in terms of $\sqsubseteq_d$, then it must be an image root.

Proof. The proof is given in two parts.
  I. If a recursive application p is not an application root, then its distinguished name f must consist of another distinguished name f' concatenated by its related distinguished name. According to the definition of the recursive enumerations of lambda expressions, we must be able to find a recursive application p' such that its distinguished name is f'. Therefore, if a recursive application $p_1$ is a root in terms of $\sqsubseteq_r$, then it must be an application root;
  II. If a recursive application p is not an image root, then its related distinguished name must be a distinguished name (surrounded by a pair of brackets []). According to the definition of lambda expression C≡e that C and e must be the distinguished name and the corresponding value of a recursive application p' in the union of the recursive enumerations of the given lambda expressions, we must be able to find the recursive application p' such that its distinguished name is the related distinguished name of the recursive application p. Therefore, if a recursive application is a root in terms of $\sqsubseteq_d$, then it must be an image root.□

Property 6. The union of the recursive enumerations of a set of lambda expressions is acyclic under the combination of the relations $\sqsubseteq$r and $\sqsubseteq$d. In other words, there don't exist two distinguished recursive applications $p_1$ and $p_2$ in the union such that $p_1$ $\sqsubseteq$r $p_2$, and $p_2$ $\sqsubseteq$d $p_1$.

Proof. Assume that $p_1$ is not identical to $p_2$, $p_1$ $\sqsubseteq$r $p_2$, and $p_2$ $\sqsubseteq$d $p_1$ in the union. According to the definitions of $\sqsubseteq$r and $\sqsubseteq$d, $p_2$ depends on $p_1$ through $\sqsubseteq$r, and $p_1$ depends on $p_2$ through $\sqsubseteq$d. These dependent relationships can be represented by two functions, e.g., f and g, such that $p_2$=f($p_1$) and $p_1$=g ($p_2$), or equivalently, $p_2\hat{\,}1$=f($p_1\hat{\,}1$) and $p_1\hat{\,}1$=g ($p_2\hat{\,}1$). As the result, $p_1\hat{\,}1$=g (f($p_1\hat{\,}1$)) holds true. In other words, the distinguished name of the recursive application $p_1$ (or $p_2$) recursively depends on itself, which implies an infinite loop in constructing the distinguished name of $p_1$. The process of constructing $p_1\hat{\,}1$ by a Turing machine will never stop. This implies that $p_1$ cannot be in the domain of its rator, or that $p_1$ doesn't have its normal form. Therefore, $p_1$ (and $p_2$) will be not in the union, which contradicts to the assumption.□

Property 4 and 6 state that there exist dependences among recursive applications in the union of recursive enumerations, and that a recursive application in the union of recursive enumerations doesn't rely on itself. In the book "Foundations of Databases" by S. Abiteboul, R. Hull, and V. Vianu, Addison-Wesley Publishing Company, 1995, data dependencies are categorized as functional dependency, join dependency, and inclusion depleting under relational databases. Under the databases of this invention, they are uniformly restated as Functional dependency. A recursive application $p_2$ is functionally dependent on $p_1$ iff there exist 0 or multiple recursive applications in the union, $q_1$, $q_2$, . . . , $q_n$, such that either $p_2$ is identical to $p_1$, or $p_1$ $\sqsubseteq_r$ (or $\sqsubseteq_d$)$p_2$, or $p_1$ $\sqsubseteq_d$ (or $\sqsubseteq_d$)$q_1$, $q_1$ $\sqsubseteq_r$ (or $\sqsubseteq_d$)$q_2$, . . . , $q_{n-1}$ $\sqsubseteq_r$ (or $\sqsubseteq_d$)$q_n$, and $q_n$ $\sqsubseteq_r$ (or $\sqsubseteq_d$)$p_2$. If the recursive application $p_2$ is functionally dependent on pi, then the existence of $p_2$ must imply the existence of $p_1$ in the union. This implication reflects evolutions (or variations) of the world, that is, new entities are born in dependences with the existing world; and the death of a big entity implies the death of dependent small entities from the world. Property 5 further states that if $p_2$ is dependent on $p_1$, then $p_1$ must exist if $p_2$ exists.

Properties 4, 5, and 6 not only coincide with the evolutions of the world, but also provide a database management system with the theoretical foundation in data queries and data update operations.

5. Databases

If the world were not changing chronologically, we would define a database as the union of the recursive enumerations of lambda expressions. However, except for natural laws defined by human beings such as a mathematical theorem or a physical phenomenon, all things vary with time. And the major objective of a database is to keep track of variations of the world. To reflect the consistencies of the variation of the world with database application practices, we introduce the mathematical definitions of database and database schema on the basis of recursive enumerations. In this section, we first define the concept of restrictions of recursive enumerations. Then we define a database as a restriction of the recursive enumerations of a set of lambda expressions defined in its data schema. The restriction keeps the properties of recursive enumerations invariant. Alternatively, a database can be viewed as the recursive enumerations of a single lambda expression by a different way of defining its data schema. From Theorem 1 in Section 3 and Theorem 2 in this section, we can see that the class of databases has one-to-one correspondence with the class of lambda-definable functions.

To reflect variations of the world, we introduce the concept of restrictions of recursive enumerations. A restriction of the union of the recursive enumerations of lambda expressions is a subset of the union of the recursive enumerations of the lambda expressions such that:

I. this subset is tree-structured under both $\sqsubset_r$ and $\sqsubset_d$.

II. If a recursive application is a root in terms of $\sqsubset_r$, then it must be an application root;

and if a recursive application is a root in terms of $\sqsubset_d$, then it must be an image root.

For F=$\lambda$x. sq x, for example, the set {<[F], $\lambda$x. sq x>}, and {<[F], $\lambda$x. sq x>, <[[F]2], 4>} are the restriction of the recursive enumeration of function F, but {[[F]2], 4>} is not a restriction. To see the factors which determine restrictions, restrictions can be viewed by a higher-order functional (called restriction) of recursive enumerations with the time as the argument, that is, $$\lambda\omega,\lambda t.f(\omega, t) \qquad (7)$$

Where $\omega$ is the union of the recursive enumerations of the lambda expressions, t is a time, and f is a function taking $\omega$ and t as the arguments, the output is a subset of the $\omega$ which meets the conditions I and II specified above.

A data schema is the definition of a set of lambda-definable functions in lambda expressions for a database application. In a data schema, the bound variable of each lambda expression in abstraction has its domain estimated to include all the possible values which may occur, and each value in the domain is recursively defined by a lambda expression. Therefore, database design processes are the processes of finding lambda-definable functions for database applications.

Rather than a set of lambda expressions, an alternative data schema for a database application can be defined as a single identity function l=$\lambda$x.x, which takes the set of the given it lambda expressions as the domain of the bound variable x. The two alternative ways in defining the data schema for a database application are equivalent in representing the database application, although the second definition has an additional higher-level identity functional. The first way of defining the data schema for a database application reflects the practices of database applications in which individual, independent databases represent specific portions of the world. The second way of defining the data schemata for a database application reflects the fact that the union of individual portions of the world becomes a single unity, which can be represented by a single lambda expression. Since the two ways of defining the data schemata are equivalent, we interchangeably use one of the two ways of defining data schemata in the rest of the description.

A database for a database application at a given time is a restriction of the union of the recursive enumerations of the set of the lambda expressions defined in the data schema of the database application. Or equivalently in terms of the functional $\lambda\omega,\lambda t. f(\omega, t)$ defined in equation (7), a database for a database application at a given time is the application of the functional restriction achieved by applying it to the union of the recursive enumerations of the set of the lambda expressions defined in the data schema and the given time.

The definition of databases given above reflects the data evolutions of database applications. Although it is common in database practices for a single database application to come up with multiple versions of databases, we must assume that a database at a given time must be unique, that is, the output of an application of the functional restriction defined in (7) must be unique. In database application practices, if two databases are different at a given time, but their schemata are the same, we must assume that only one of them is the right database reflecting the reality of the world, and the other one must be overwritten.

Theorem 2: A database is the recursive enumeration of a lambda-definable function.

Proof. In order to prove this theorem, we take the second way of defining the data schemata. That is, the data schema for a database application is the definition of the identity function l=$\lambda$x.x which takes the set of lambda expressions for the database application as the domain of the bound variable x. Therefore, a resulting database $\Psi$ is a restriction of the recursive enumeration of the defined identity function.

Supposing that the domain of the identity function defined in the data schema is dom l, we then need to show that the database $\Psi$ is the recursive enumeration of the same identity function with different domain dom l', and in fact dom l' is a subset of dom l in the recursive manner as described below. The proof is done if dom l' is defined.

For readability in the equations given below, we rewrite a lambda expression in normal form as ||e, the domain of e||, where e is in pure lambda expression form with the syntax given in (2). If e is a constant, then the domain of e is $\phi$; If e is an abstraction, then the domain of e is the domain of the bound variable. And we also assume that all the lambda expressions embedded in a recursive enumeration are given in their pure lambda expression form. Therefore, if we can give the definition of the identity function with domain dom t' in the form of ||l, the domain of l'||, then the proof is done. First, we define a lambda expression which takes a recursive application as its argument, that is:

$$Dom = \lambda x. \left\| x^\wedge 2, \bigcup_{x \sqsubset_r y} \{\|\rho y, Dom\ y\|\} \right\| \qquad (8)$$

Where x, y $\in \Psi$, $\rho$ y is denoted as the related distinguished name of y, and the function Dom always has its default database $\Psi$ on which the function is based. The function Dom gives a recursive manner in defining the domain of a lambda expression corresponding a recursive application in a database. If $\rho$ y is the name C of an expression like C$\equiv$e, Then the whole lambda expression C$\equiv$e can be recovered from the lambda expressions defined in the data schema.

Assuming that the application root of the identity function is p, then:

$$\|l, \text{the domain of } l'\| = \text{Dom p} \qquad (9)$$

where Dom is based on $\Psi$.$\square$

Theorem 1 and Theorem 2 imply that the class of databases has one-to-one correspondence with the class of effectively computable functions.

7. Database evolutions.

To reflect the variations of the world, we must have operations to maintain the consistency of the managed data with the real world. Given a data schema, operations update, creation, and deletion are the minimum set of operations for database evolutions. In this section, we introduce the operations and claim that databases are closed under the operations.

The first operation is the update operation. The update operation is an operation which updates the value of a recursive application which has a constant as its value (called atomic value). This operation can not update a recursive application whose value is an abstraction. Therefore, the update operation takes as arguments a database, a recursive application in the database, and an atomic value, and returns the updated database.

The second operations is the creation operation. In a database $\Psi$, we add a recursive application p (p $\notin$ $\Psi$, but p is in the union of the recursive enumerations of the lambda expressions defined in the data schema), such that either 1), p is an application root, or 2), there is a recursive application q in the $\Psi$, such that q $\sqsubset_r$ p.

Before we introduce the deletion operation, a set of recursive applications called the biography with respect to a given recursive application must be identified. The biography of a recursive application is the collection of all recursive applications in a database which functionally depend on the given recursive application. Therefore, the whole biography must be deleted if the given recursive application is to be deleted. A lambda expression of the function biography against a database $\Psi$ is given below:

$$\beta = \lambda x: \{x\} \cup \bigcup_{x \sqsubset_r y} \beta y \cup \bigcup_{x \sqsubset_d y} \beta y \qquad (10)$$

where x, y $\in$ $\Psi$.

In a database $\Psi$, A deletion operation taking a recursive application p is defined as the deletion of the biography of the recursive application from $\Psi$, that is, the result of the deletion of $\beta$ p is $$\Psi' = \Psi - (\beta p). \qquad (11)$$

Theorem 3 Databases are closed under the operations update, creation, and deletion. That is, the database resulting from one of the three operations is still a database.

Proof. A database is defined to be a subset of the union of the recursive enumerations of the lambda expressions defined in its data schema such that the subset satisfies the following requirements: 1), this subset is tree-structured under both $\sqsubset_r$ and $\sqsubset_d$; and 2), if a recursive application is a root in terms of $\sqsubset_r$, then it must be an application root, and if a recursive application is a root in terms of $\sqsubset_d$, then it must be an image root. In the following we give the proof for each operation.

I. Operation update. Because the update operation doesn't change the structure of the database, the resulting database must be a database again.

II. Operation creation. We analyze it case by case:
  A. If a recursive application p to be created is an application root, then the union of the database $\Psi$ and {p} must be tree-structured in terms of $\sqsubset_r$, and there is no root q in the union in terms of $\sqsubset_r$ such that the root q is not an application root.
  B. If a recursive application p to be created is not an application root, then there must exist one and only one recursive application q such that q $\sqsubset_r$ p. Therefore, the union of the database $\Psi$ and {p} must be tree-structured in terms of $\sqsubset_r$, and there is no new root in terms of $\sqsubset_r$ added in $\Psi$.
  C. If the recursive application p to be created is an image root, then the union of the database $\Psi$ and {p} must be tree-structured in terms of $\sqsubset_d$, and there is no root q in the union in terms of $\sqsubset_d$ such that the root q is not an image root.
  D. If the recursive application p to be created is not an image root, then there must exist one and only one recursive application q such that q $\sqsubset_d$ p. Therefore, the union of the database $\Psi$ and {p} must be tree-structured in terms of $\sqsubset_d$, and there is no new root in terms of $\sqsubset_d$ added in $\Psi$.

Therefore, the creation operation maintains the properties of databases.

III. Operation deletion. Since the union of the recursive enumerations of lambda expressions defined in the data schema is tree-structured under both $\sqsubset_r$ and $\sqsubset_d$, a restriction of it as a subset must also be tree-structured under both $\sqsubset_r$ and $\sqsubset_d$. The rest we need to show is that any root in terms of $\sqsubset_r$ or $\sqsubset_d$ must be an application root or an image root respectively.
  A. For a recursive application q $\in$ $\Psi'$ and obviously q $\in$ $\Psi$, if it is an application root in $\Psi$, then it is still an application root in $\Psi'$; if it is a non-application root, then there exists a recursive application r in $\Psi$ such that r $\sqsubset_r$ q. Assuming that r $\notin$ $\Psi'$, but r $\in$ $\beta$p, it must be true that q $\in$ $\beta$p, that is, q $\notin$ $\Psi'$ by the definition of the operator $\beta$. This is a contradiction. Therefore, a root in terms of $\sqsubset_r$ in $\Psi'$ must be an application root.
  B. For a recursive application q $\in$ $\Psi'$ and obviously q $\in$ $\Psi$, if it is an image root in $\Psi$, it is still an image root in $\Psi'$; If it is a non image root, then there exists a recursive application r in $\Psi$ such that r $\sqsubset_d$ q. Assuming that r $\notin$ $\Psi'$, but r $\in$ $\beta$p, it must be true that q $\in$ $\beta$p, that is, q $\notin \Psi'$ by the definition of the operator $\beta$. This is a contradiction. Therefore, a root in terms of $\sqsubset_d$ in $\Psi'$ must be an image root.

We proved that databases are closed under the operation deletion. $\square$

References:

[AhoUl179] Alfred V. Aho and Jeffrey D. Ullman. Universality of Data Retrieval Languages. Conference Record of the Sixth Annual ACM Symposium on Principles of Programming Languages, San Antonio, Taxes, January, 1979.

[Codd70] E. F. Codd. A Relational Model of Data for Large Shared Data Banks. Comm. ACM 13, 6, June 1970, Pages 377–387.

[Codd72] E. F. Codd. Further Normalization of the Data base Relational Model. Data Base Systems edited by Randall Rustin, Prentice-Hall, 1971.

[Elmasri94] Ramez Elmasri and Shamkant B. Navathe. Fundamentals of Database Systems, Second Edition. The Benjamin/Cummings Publishing Company, Inc., 1994.

[Hudak89]. Paul Hudak. Conception, Evolution, and Application of Functional Programming Languages. ACM Computing Survey, Vol. 21, No. 3, September 1989.

[HopUll79] John E. Hopcroft, Jeffrey D. Ullman. Introduction to Automata Theory, Languages, Computation. Addison-Wesley Publishing Company, 1979.

[Kim88] Won Kim, Hong-Tai Chou, and Jay Banerjee. Operations and Implementation of Complex Objects. IEEE Transactions on Software Engineering, Vol. 14, No. 7, July 1988.

[Meyer90] Bertrand Meyer. Introduction to the Theory of Programming Languages. Prentice Hall, 1990.

[Steed93] Douglas Steedman. X.500—The Directory Standard and its Application. Technology Appraisals, 1993.

[Stoll63] Robert R. Stoll. Set Theory and Logic. W. H. Freeman and Company, 1963.

[Stoy77] Joseph E. Stoy. Denotational Semantics: The Scott-Strachey Approach to programming language theory. The MIT Press, 1977.

[Ullman88] J. D. Ullman. Principles of Database and Knowledge-base Systems, volume I. Computer Science Press, 1988.

[XuBhar96] Kevin Houzhi Xu and Bharat Bhargava. An Introduction to Enterprise-Participant Data Model. Seventh International Workshop on Database and Expert Systems Applications, September, 1996, Zurich, Switzerland, page 410–417.

CONCLUSION

Accordingly, readers will see that the LDF database management systems of this invention improve the computing automations of database applications in the sense that application-dependent software (including application-dependent constraints, application query interpreter, and data interpreter) is not needed. High computing automation immediately implies the lower cost of database applications, shorter development-life cycle, high system reliability. Clean functional partitioning in the system architectures of database applications optimize the system performances and ease the understandings to the database applications of human beings. Because a LDF database management system is able to use hierarchical structure to physically store data, the system performance is improved in storing large volume of data. A LDF database management systems is able to communicate with other database systems and non-database computing systems that uses a functional programming language as the communication language. In addition, LDF database management systems can support infinite data by using finite data storage because it is able to store and manage a function under the class of effectively computable functions. In summary, it can be used to store and manage all kinds of informations in businesses, computer systems, scientific researches such as for operating systems, file systems, computer graphics, software engineering, application-dependent data, or any data equivalent to lambda-definable functions.

Although the description above contains many specifications, these should not be construed as limiting the scope of the invention but as merely providing illustrations of some of the presently preferred embodiments of this invention. For example, a LDF database management system can have more than two types of links. This description only specifies solid links and dash links. However, for implementation reasons (such as data multiple versions, security, and data concurrent control), a third, a fourth, and/or a n-th type of links can be used. Another example is query languages. LDF DBMSs of this invention can use any language that is equivalent to lambda calculus, or a subset of lambda calculus. This description only specifies a calculus-based query language, and a functional-based language.

Thus the scope of the invention should be determined by the appended claims and their legal equivalents, rather than by the examples given.

I claim:

1. A computing apparatus having memory means, comprising a database stored in said memory means, and an interface means interacting with peripheral apparatuses and an implementation means, said database comprising (I) zero or more nodes, each of said nodes comprising an identifier and a value, said value occupying a piece of said memory means that is selected from a group of data types comprising empty, integers, floating numerical numbers, characters, strings, effectively computable functions, files, multimedia data, and user-defined data.

(II) zero or more number of links selected from a group comprising at least a first link type and a second link type, each of said links having a tail means connecting to a node and a head means connecting to a node, each of said nodes being attached by the head means of zero or more links of the first link type; being attached by the tail means of zero or one link of the first link type; being attached by the head means of zero or more links of the second link type; and being attached by the tail means of zero or one link of the second link type, whereby the nodes and the links of the first link type forms a set of trees; and the nodes and the links of the second link type forms a set of tree, and whereby the tees reflect dependent relationships among the nodes, said implementation means comprising a plurality of query procedures selected from a group comprising a query procedure that has a plurality nodes as parameters for retrieving the nodes which depend on the given nodes with respect to the first link type; a query procedure that has a plurality of nodes as parameters for retrieving the nodes which depend on the given nodes with respect to the second link type; a query procedure that has a plurality of nodes as parameters for retrieving the nodes which am depended by the given nodes with respect to the fist link type; and a query procedure that has a plurality of nodes as parameters for retrieving the nodes which are depended by the given nodes with respect to the second link type.

2. The computing apparatus of claim 1 wherein said interface means comprises a procedure that is used to receive data access requests with references to said database from said peripheral apparatuses; to interact with said implementation means that accesses said database and forms responses satisfying said data access requests; and to return said responses to said peripheral apparatuses.

3. The computing apparatus of claim 1 wherein said implementation means further comprises a plurality of procedures selected from a group comprising an creation procedure that is used to enter a plurality of new nodes into said database; a deletion procedure that is used to erase a plurality of nodes that have dependent relationships with a plurality of nodes provided as the parameters of said data access requests, and to erase a plurality of corresponding links from said database; and an update procedure for updating values of nodes or updating links connecting nodes.

4. The computing apparatus of claim 1 wherein said memory means is either main memories, secondary storages, or peripheral apparatuses.

* * * * *